US011228487B2

(12) United States Patent
He et al.

(10) Patent No.: US 11,228,487 B2
(45) Date of Patent: Jan. 18, 2022

(54) SEARCH SPACE CONFIGURATION FOR POWER EFFICIENT RECEPTION

(71) Applicant: QUALCOMM Incorporated, San Diego, CA (US)

(72) Inventors: Linhai He, San Diego, CA (US); Prashanth Haridas Hande, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 16/745,243

(22) Filed: Jan. 16, 2020

(65) Prior Publication Data
US 2020/0244528 A1    Jul. 30, 2020

Related U.S. Application Data

(60) Provisional application No. 62/797,914, filed on Jan. 28, 2019.

(51) Int. Cl.
*H04W 72/04*     (2009.01)
*H04L 12/24*     (2006.01)
(Continued)

(52) U.S. Cl.
CPC ........ *H04L 41/0816* (2013.01); *H04L 1/0003* (2013.01); *H04L 1/1812* (2013.01);
(Continued)

(58) Field of Classification Search
CPC ........... H04W 28/0268; H04W 72/042; H04W 72/1289; H04W 72/0453; H04L 41/0816; H04L 1/0003; H04L 1/1812
See application file for complete search history.

(56) References Cited

U.S. PATENT DOCUMENTS 9,729,295 B2     8/2017  Zhang et al.
2013/0294318 A1*  11/2013  Amerga ............... H04W 4/06
                                                  370/312
(Continued)

FOREIGN PATENT DOCUMENTS

WO     2013113986 A1    8/2013

OTHER PUBLICATIONS

International Search Report and Written Opinion—PCT/US2020/014143—ISA/EPO—dated May 20, 2020.
(Continued)

*Primary Examiner* — Wei Zhao
(74) *Attorney, Agent, or Firm* — Arent Fox, LLP

(57) ABSTRACT

In an access network, a base station may aggregate data packets for a user equipment (UE) into transport blocks and configure a control channel to allow the UE to sleep between control channel monitoring occasions to save power. Such data aggregation, however, may be subject to changes in traffic load and/or link quality that may result in a too low data rate or too frequent monitoring. A base station that receives data to transmit to the UE and aggregates the data according to configured control configuration parameters of the UE may determine that a link quality or a traffic load for the UE has changed. The base station may reconfigure the control channel configuration parameters of the UE based on at least one of the link quality or the traffic load in order to obtain a data rate that satisfy the traffic load for the UE.

30 Claims, 11 Drawing Sheets

(51) Int. Cl.
  *H04W 28/02* (2009.01)
  *H04L 1/18* (2006.01)
  *H04L 1/00* (2006.01)

(52) U.S. Cl.
  CPC ..... *H04W 28/0268* (2013.01); *H04W 72/042* (2013.01); *H04W 72/0446* (2013.01)

(56) References Cited

U.S. PATENT DOCUMENTS

2019/0313437 A1* 10/2019 Jung ............... H04L 5/0042
2021/0168849 A1*  6/2021 Oh ................. H04W 72/042

OTHER PUBLICATIONS

Qualcomm Incorporated: "UE Adaptation to the Traffic and UE Power Consumption Characteristics," 3GPP Draft, 3GPP TSG-RAN WG1 Meeting #95, R1-1813447, UE Adaptation For Power Saving, 3rd Generation Partnership Project (3GPP), Mobile Competence Centre, 650, Route Des Lucioles, F-06921, Sophia-Antipolis Cedex, France, vol. RAN WG1, No. Spokane, Washington, USA, Nov. 12, 2018-Nov. 16, 2018, Nov. 11, 2018, XP051555486, 20 Pages.

Item 2 Continued Retrieved from the Internet: URL: http://www.3gpp.org/ftp/Meetings%5F3GPP%5FSYNC/RAN1/Docs/R1%2D1813447%2Ezip [retrieved on Nov. 11, 2018], Section 5.2, Section 4.3.2, the whole document.

Samsung: "UE Adaptation Schemes", 3GPP Draft, 3GPP TSG RAN WG1 Meeting #95, R1-181011 UE Adaptation Schemes, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018 Nov. 11, 2018 (Nov. 11, 2018), XP051554989, 11 Pages, Retrieved from the Internet: URL:http://www.3gpp.org/ftp/Meetings%6F3GPP%5FSYNC/RAN1/Docs/R1%2D1813011%2Ezip[retrieved on Nov. 11, 2018] sections 2.1 and 2.6.

Vivo: "Modeling and Evaluation Results for Gaming", 3GPP Draft, 3GPP TSG RAN WG1 Ad-Hoc Meeting 1901, R1-1900148 Modeling and Evaluation Results for Gaming, 3rd Generation Partnership Project (3GPP), Mobile Competence Centre, 650, Route Des Lucioles, F-06921 Sophia-Antipolis Cedex, Fran, vol. RAN WG1, No. Taipei, Jan. 21, 2019-Jan. 25, 2019 Jan. 20, 2019 (Jan. 20, 2019), XP051593074, 6 Pages.

Item 5 Continued Retrieved from the Internet: URL:http://www.3gpp.org/ftp/Meetings%5F3GPP%5FSYNC/RAN1/Docs/R1%2D1900148%2Ezip [retrieved on Jan. 20, 2019] section 3.

* cited by examiner

SEARCH SPACE CONFIGURATION FOR POWER EFFICIENT RECEPTION

CLAIM OF PRIORITY UNDER 35 U.S.C. § 119

This application claims priority to U.S. Provisional Application No. 62/797,914 titled "SEARCH SPACE CONFIGURATION FOR POWER EFFICIENT RECEPTION," filed Jan. 28, 2019, which is assigned to the assignee hereof, and incorporated herein by reference in its entirety.

BACKGROUND

Technical Field

The present disclosure relates generally to communication systems, and more particularly, to a scheduling a control channel.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an access network, a base station may aggregate data packets for a user equipment (UE) into transport blocks and configure a control channel to allow the UE to sleep between control channel monitoring occasions. Such data aggregation, however, may be subject to changes in traffic load and/or link quality. For example, an increase in traffic load and/or a decrease in link quality may result in the base station being unable to schedule enough transport blocks to carry the data packets to the UE. Conversely, a decrease in traffic load and/or an increase in link quality may result in the UE waking up more often than necessary to receive the control channel.

A base station that receives data to transmit to the UE and aggregates the data according to configured control configuration parameters of the UE may determine that a link quality and/or a traffic load for the UE has changed. For example, the base station may monitor a reported channel quality indicator (CQI) or a selected modulation and coding scheme (MCS) The base station may reconfigure the control channel configuration parameters of the UE based on at least one of the link quality or the traffic load. For example, the base station may indicate a new set of control channel configuration parameters. The aggregated data for the traffic load may be scheduled at a traffic rate based on the link quality and the reconfigured control channel configuration parameters of the UE. Accordingly, the base station may adjust the control channel configuration based on changing traffic load or link quality to allow the UE to receive data and also save power by sleeping between control channel monitoring occasions.

In another aspect, the UE may manage control channel configuration parameters. The UE may receive a downlink control channel according to a current set of control channel configuration parameters. The UE may reconfigure the current set of control channel configuration parameters to a new set of control channel configuration parameters selected from a plurality of control channel configuration parameter sets. For example, the UE may receive an indication of the new set of control channel configuration parameters on either a media access control (MAC) control element or physical layer downlink control information. Such an indication may allow the UE to quickly change to the new set of control channel configuration parameters. In another aspect, the UE may independently change the set of control channel configuration parameters in response to detecting a link quality condition or a traffic load condition. Accordingly, the UE may change the control channel configuration parameters without signaling from the base station. The UE may receive the downlink control channel according to the new set of control channel configuration parameters.

In an aspect of the disclosure, methods, computer-readable media, and apparatuses are provided. A method of wireless communication at a base station may include receiving data to transmit to a UE. The method may include aggregating the data according to configured control channel configuration parameters of the UE. The method may include determining that a link quality or a traffic load for the UE has changed. The method may include reconfiguring the control channel configuration parameters of the UE based on at least one of the link quality or the traffic load. The aggregated data for the traffic load is scheduled at a traffic rate based on the link quality and the reconfigured control channel configuration parameters of the UE.

In another aspect, a method of wireless communication at a UE may include receiving a downlink control channel according to a current set of control channel configuration parameters. The method may include detecting at least one of a link quality condition or a traffic load condition at the UE. The method may include reconfiguring the current set of control channel configuration parameters to a new set of control channel configuration parameters selected from a plurality of control channel configuration parameter sets in response to detecting the link quality condition or the traffic load condition. The method may include receiving the downlink control channel according to the new set of control channel configuration parameters.

In an aspect, a first example apparatus for wireless communication, may include means for receiving data to transmit to a UE. The apparatus may include means for aggregating the data according to configured control channel configuration parameters of the UE. The apparatus may include means for determining that a link quality or a traffic load for the UE has changed. The apparatus may include means for reconfiguring the control channel configuration parameters of the UE based on at least one of the link quality or the traffic load. The aggregated data for the traffic load is scheduled at a traffic rate based on the link quality and the reconfigured control channel configuration parameters of the UE In another aspect, a second example apparatus for wireless communication may include means for receiving a downlink control channel according to a current set of control channel configuration parameters. The apparatus may include means for detecting at least one of a link quality condition or a traffic load condition at the UE. The apparatus may include means for reconfiguring the current set of control channel configuration parameters to a new set of control channel configuration parameters selected from a plurality of control channel configuration parameter sets in response to detecting the link quality condition or the traffic load condition. The apparatus may include means for receiving the downlink control channel according to the new set of control channel configuration parameters.

In another aspect, a third apparatus for wireless communication may include a memory; and at least one processor coupled to the memory. The at least one processor may be configured to receive data to transmit to a UE. The at least one processor may be configured to aggregate the data according to configured control channel configuration parameters of the UE. The at least one processor may be configured to determine that a link quality or a traffic load for the UE has changed. The at least one processor may be configured to reconfigure the control channel configuration parameters of the UE based on at least one of the link quality or the traffic load. The aggregated data for the traffic load is scheduled at a traffic rate based on the link quality and the reconfigured control channel configuration parameters of the UE In another aspect, a fourth apparatus for wireless communication may include a memory; and at least one processor coupled to the memory. The at least one processor may be configured to receive a downlink control channel according to a current set of control channel configuration parameters. The at least one processor may be configured to detect at least one of a link quality condition or a traffic load condition at the UE. The at least one processor may be configured to reconfigure the current set of control channel configuration parameters to a new set of control channel configuration parameters selected from a plurality of control channel configuration parameter sets in response to detecting the link quality condition or the traffic load condition. The at least one processor may be configured to receive the downlink control channel according to the new set of control channel configuration parameters.

In another aspect, the disclosure provides a non-transitory computer-readable medium storing computer executable code. The code when executed by a processor of a base station causes the processor to receive data to transmit to a user equipment. The code may cause the processor to aggregate the data according to configured control channel configuration parameters of the UE. The code may cause the processor to determine that a link quality or a traffic load for the UE has changed. The code may cause the processor to reconfigure the control channel configuration parameters of the UE based on at least one of the link quality or the traffic load. The aggregated data for the traffic load is scheduled at a traffic rate based on the link quality and the reconfigured control channel configuration parameters of the UE.

In another aspect, the disclosure provides a non-transitory computer-readable medium storing computer executable code. The code when executed by a processor of a UE causes the processor to receive a downlink control channel according to a current set of control channel configuration parameters. The code may cause the processor to detect at least one of a link quality condition or a traffic load condition at the UE. The code may cause the processor to reconfigure the current set of control channel configuration parameters to a new set of control channel configuration parameters selected from a plurality of control channel configuration parameter sets in response to detecting the link quality condition or the traffic load condition. The code may cause the processor to receive the downlink control channel according to the new set of control channel configuration parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
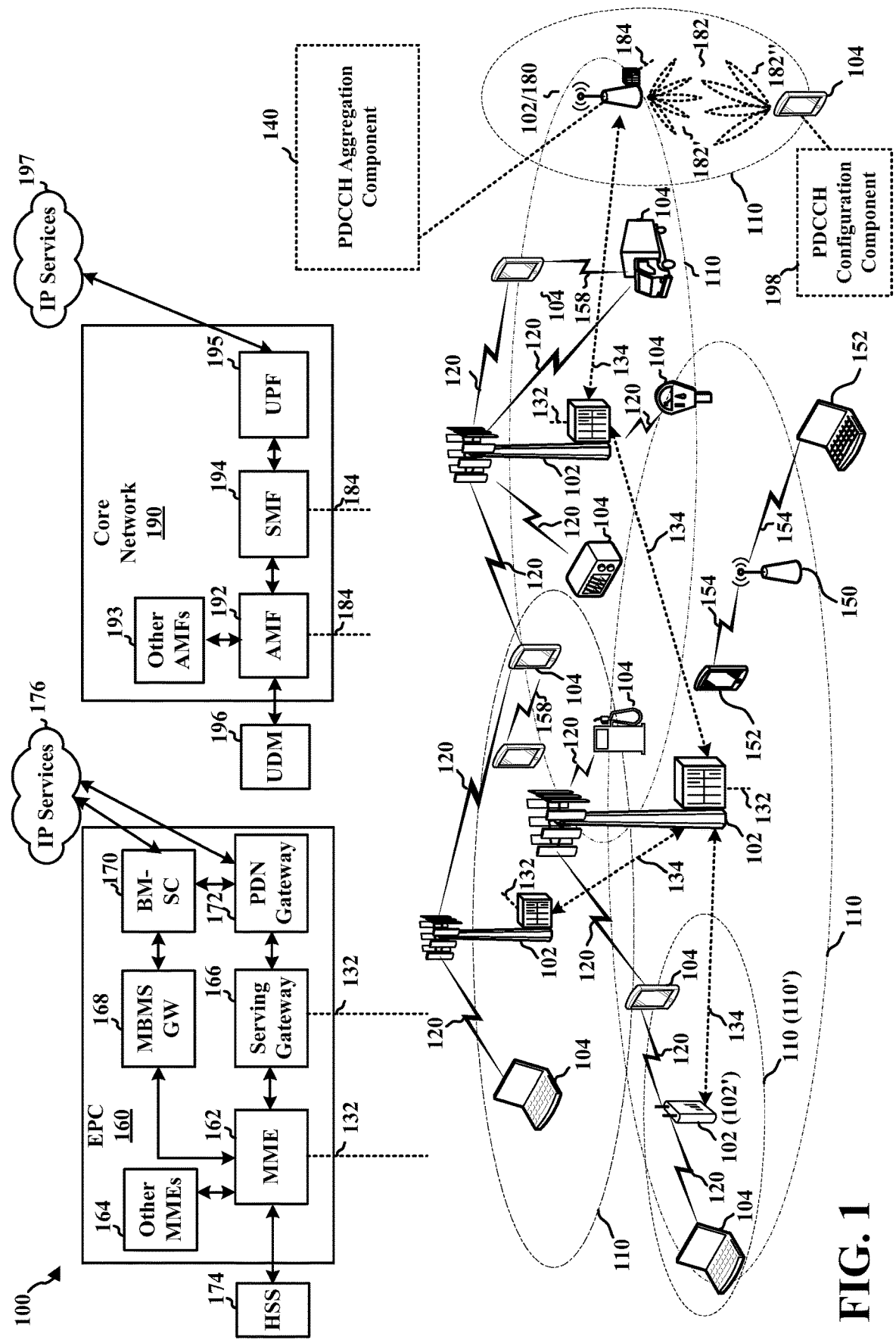
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC). The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102 may include a PDCCH aggregation component 140. The PDCCH aggregation component 140 may be configured to receive data to transmit to a user equipment 104. The PDCCH aggregation component 140 may aggregate the data according to configured control channel configuration parameters of the UE. The PDCCH aggregation component 140 may determine that a link quality or a traffic load for the UE has changed. The PDCCH aggregation component 140 may reconfigure the control channel configuration parameters of the UE based on at least one of the link quality or the traffic load. The PDCCH aggregation component 140 may schedule the aggregated data for the traffic load at a traffic rate based on the link quality and the reconfigured control channel configuration parameters of the UE.

In another aspect, the UE 104 may include a PDCCH configuration component 198. The PDCCH configuration component 198 may receive a downlink control channel according to a current set of control channel configuration parameters. The PDCCH configuration component 198 may detect at least one of a link quality condition or a traffic load condition at the UE. The PDCCH configuration component 198 may reconfigure the current set of control channel configuration parameters to a new set of control channel configuration parameters selected from a plurality of control channel configuration parameter sets. The PDCCH configuration component 198 may receive the downlink control channel according to the new set of control channel configuration parameters.

Figure 2:
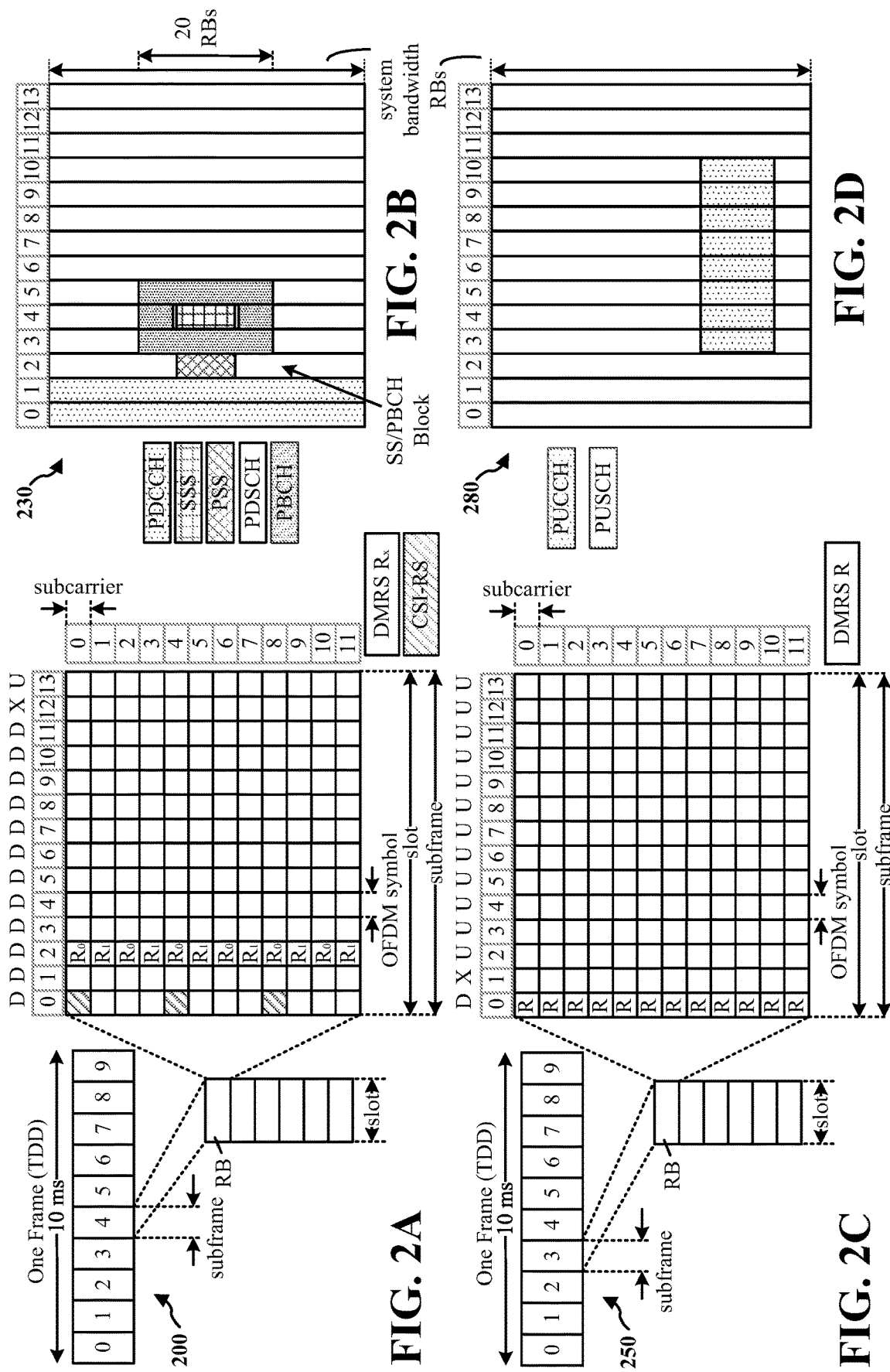
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
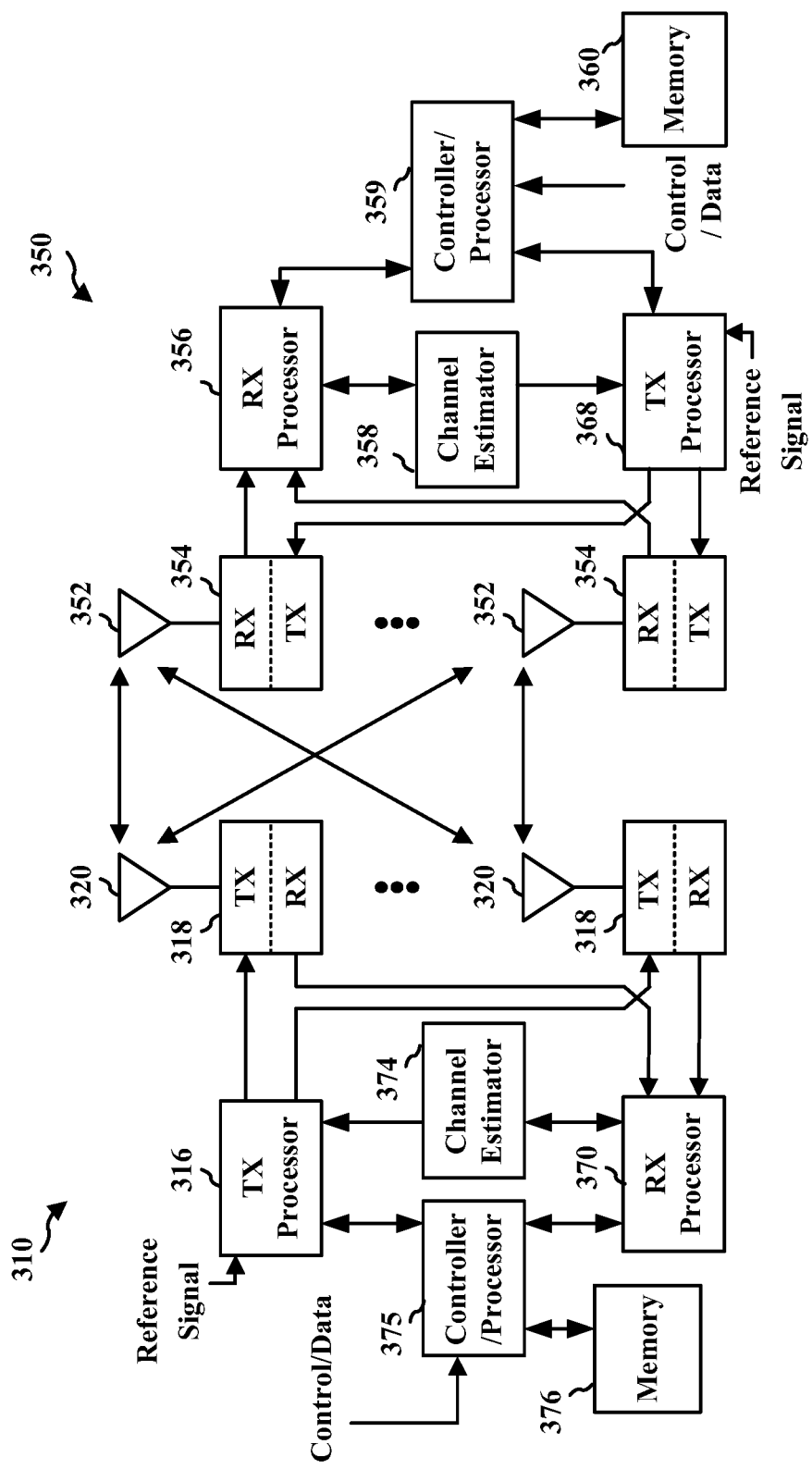
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In an aspect, if traffic for a UE 104 is delay tolerant, a base station 102 (e.g., a gNB) potentially can "aggregate" traffic to create an opportunity for power saving at the UE 104. For example, the base station may not schedule/send data as they arrive. Instead, the base station may intentionally buffer the data, and transmit the data only after the base station has aggregated enough data to form a large TB or a block of TBs. As a result, the base station may schedule the UE 104 less often, and UE 104 may monitor the PDCCH less frequently as data arrives at the base station. Accordingly, longer scheduling intervals may result in the UE 104 sleeping longer between data reception. This enables the UE to benefit from the power savings due to longer periods between data reception and results in more efficient use of wireless resources. Traffic aggregation may be effective when link throughput is higher than data arrival rate.

In an example, data arrives at an average rate of one packet every 5 ms. But the gNB schedules the UE 104 every 10 ms instead (e.g., at max delay for the application). The UE 104 can sleep 10 ms instead of 5 ms between the scheduled DL receptions. Accordingly, the UE 104 may experience lower average power consumption due to less frequent PDCCH monitoring and longer sleep time.

Figure 4:
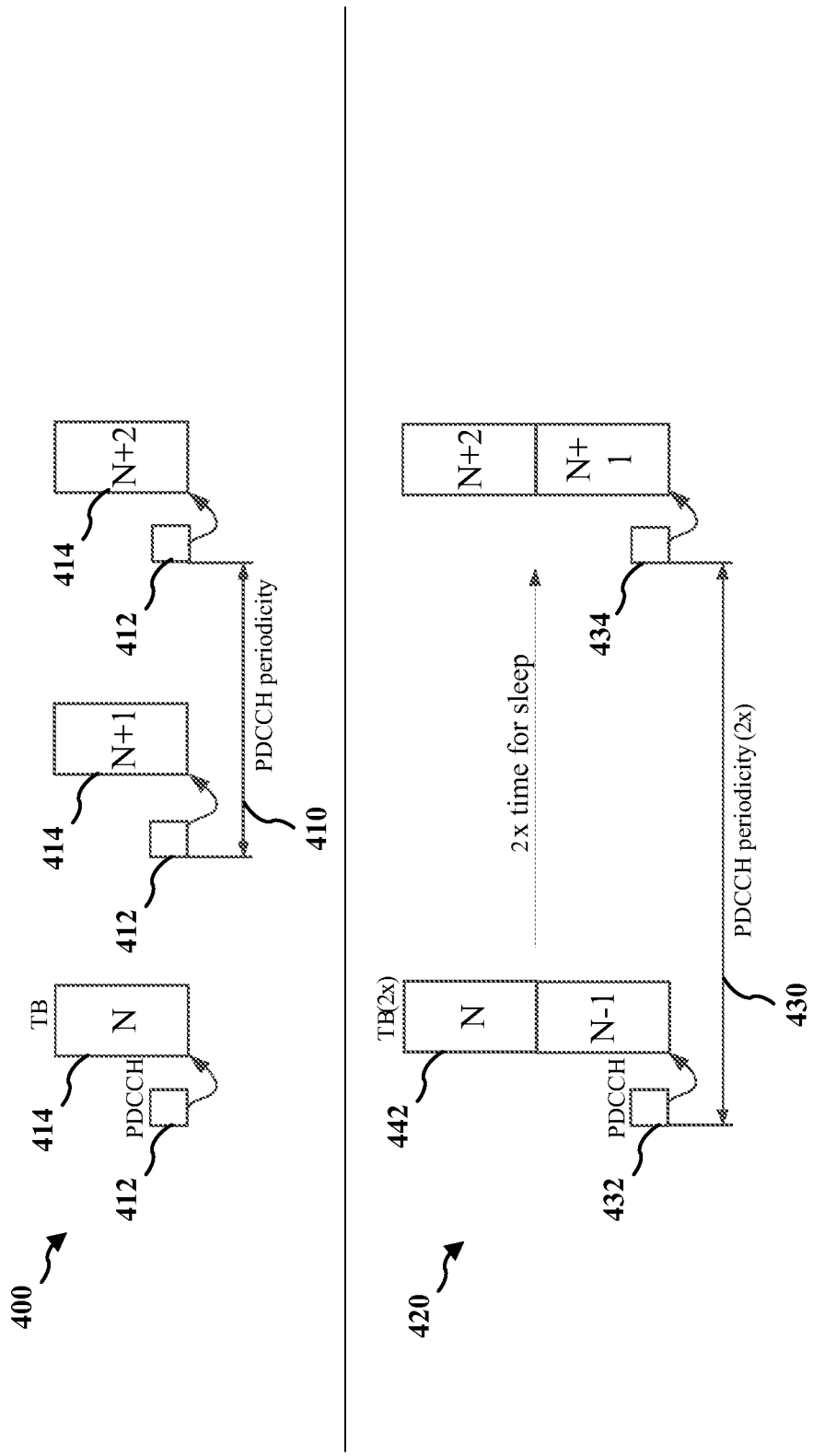
FIG. 4 is a diagram illustrating an example of data aggregation using various control channel configurations.

A network can configure a UE with a search space including periodic PDCCH monitoring occasions. Each PDCCH monitoring occasion may include multiple consecutive slots. Within each of the consecutive slots, a subset of symbols may contain a control-resource set (CORESET), which the UE uses to receive DCIs. Such a configuration can be used to implement the aforementioned "traffic aggregation." For example, the network may configure the search space periodicity to match a target scheduling interval for the UE. The network configures the number of consecutive slots to match the amount of traffic the base station schedules per PDCCH occasion. In addition, the network assigns a single HARQ processes offset parameter (K0 (for DL) and K2 (for UL)) for each HARQ process, so that the UE has a clearly defined active period after each PDCCH monitoring occasion, which enables more efficient power management. K0 is the time offset between the DCI scheduling downlink communication and receipt of the downlink communication. K2 is a similar time offset between the DCI scheduling uplink communication and transmission of the uplink communication Referring to FIG. 4, for example, according to a first control channel monitoring occasion configuration 400, a base station 102 may receive data packets N, N+1, N+2 for a UE 104 at regular intervals. The base station 102 may configure a PDCCH periodicity 410 to transmit a PDCCH 412 at the regular interval. The PDCCH 412 may schedule a transport block 414 on a PDSCH after the offset k0. The base station 102 may transmit the transport block 414. The UE 104 may sleep until the next PDCCH monitoring occasion when the UE wakes to receive PDCCH 412. The control channel monitoring occasion configuration 400 may be referred to as regular reception.

According to a second control channel monitoring occasion configuration 420, the base station 102 may configure a PDCCH periodicity 430 that is twice the duration of the PDCCH periodicity 410. The data packets N, N+1, N+2 may arrive at the base station 102 at the same rate. The base station 102 may transmit a PDCCH 432 at the PDCCH periodicity 430. The PDCCH 432 may schedule one or more transport blocks 442. For example, the transport block 442 may include data packets N−1 and N. The UE 104 may sleep until the next PDCCH monitoring opportunity when the UE 104 wakes to receive PDCCH 434. Since the PDCCH periodicity 430 is twice the PDCCH periodicity 410, the UE 104 may sleep for approximately twice as long under the control channel monitoring occasion configuration 420 than the control channel monitoring occasion configuration 400. The control channel monitoring occasion configuration 420 may be referred to as a traffic aggregation configuration.

Such a configuration for traffic aggregation may be adapted when link quality or traffic load changes. For example, when link quality degrades, the amount of data that the network can schedule per monitoring occasion may drop. Also, when traffic load increases, existing scheduling occasions may not be sufficient to schedule all of the arriving traffic and data may start accumulating. In either case, if the network no longer can keep up with scheduling arriving traffic, then the network may either increase the number of scheduling slots per monitoring occasion or reduce the periodicity of the monitoring occasions.

A change to the control channel configuration may be done by an RRC reconfiguration procedure, which may take at least 15 milliseconds (ms). This delay can cause data to accumulate at the base station when the traffic load changes, and thus may affect the stability of scheduling by the base station. Additionally, or alternatively, the delay may cause the UE to consume unnecessary power when a traffic load decreases. To save power, the scheduling interval may be extended as soon as possible after the decreased traffic load is detected.

In an aspect, faster signaling (e.g., based on either L1 DCI or L2 MAC-CE) can be used to ensure scheduling stability and power efficiency. In either option, the signaling may indicate an index to a set of PDCCH configuration parameters. Sets of PDCCH configuration parameters may either be defined in a standards specification or configured by dedicated RRC signaling. This set of PDCCH configuration parameters may include any combination of a periodicity of PDCCH monitoring occasions (e.g., monitoringSlotPeriodicityAndOffset in RRC information element (IE)), a number of slots per PDCCH monitoring occasion (e.g., duration in RRC IE), and/or the HARQ parameters k0 and k2.

In an aspect, transition from regular reception to traffic aggregation may be accomplished in various ways. In one example, the transition from regular reception to traffic aggregation may be accomplished using dynamic signaling (either DCI or MAC-CE based). Either the network or the UE may request a change in configuration. For example, the UE may transmit a MAC-CE indicating a request to change configuration, and the network may respond with either a DCI or MAC-CE indicating the new configuration. In another example, the transition from regular reception to traffic aggregation may be measurement triggered. For example, if MCS in DL assignments or UL grants averaged over the last X number of slots is higher than the average traffic rate by a threshold percentage, both the network and the UE may switch to a traffic aggregation mode. The UE and the base station may switch to the traffic aggregation mode independently, e.g., without additional signaling between the base station and the UE to inform each other of the switch. The opposite transition from the traffic aggregation mode to regular reception may similarly be accomplished by dynamic signaling (either DCI or MAC-CE based) or may be measurement triggered. For example, if MCS in DL assignments or UL grants averaged over the last X number of slots is less than the average traffic rate by a threshold amount, e.g., (1+Z)%, both network and UE may switch to regular reception mode. As with the switch to the traffic aggregation mode, the UE and base station may switch to the regular reception mode in an independent manner, e.g., without additional signaling between the base station and the UE to inform each other of the switch.

Figure 5:
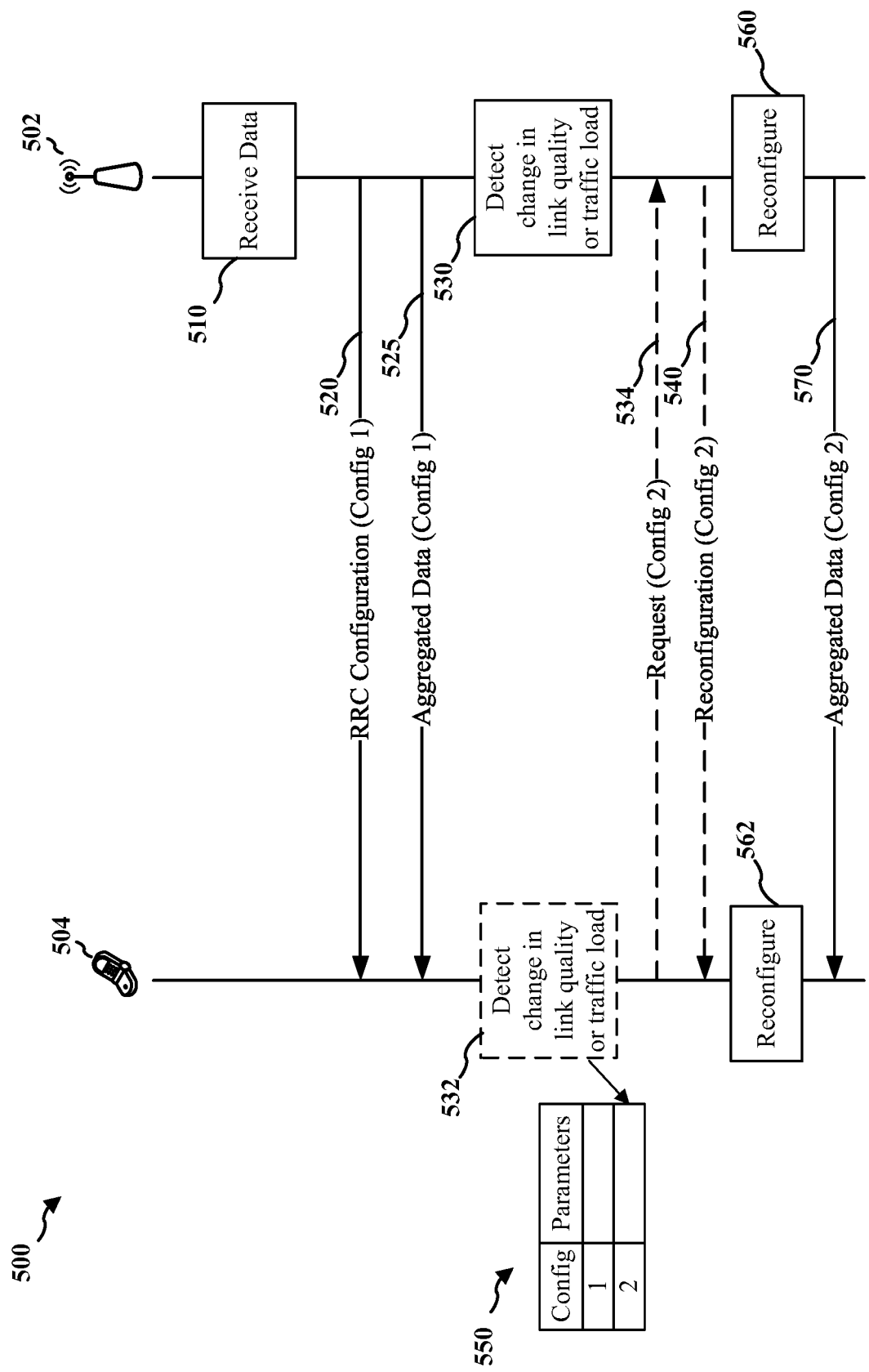
FIG. 5 is a call flow diagram illustrating an example technique for changing control channel configuration.

Referring to FIG. 5, a call flow diagram 500 shows example communications between a base station 502 and a UE 504 for reconfiguring a control channel monitoring occasion configuration. The base station 502 may be an example of the base station 102 and the UE 504 may be an example of the UE 104.

At block 510, the base station 502 may receive data for the UE 504. The data may be, for example, a video or audio stream. A bearer may be configured with properties specifying the data rate of the data. The base station 102 may determine a schedule for transmitting the data to the UE 104 and configure/select a first PDCCH monitoring occasion configuration that provides for transmission of the data at the data rate. For simplicity, the first PDCCH monitoring occasion configuration is labeled "Config 1").

In an aspect, the base station 502 may transmit an RRC configuration 520 to the UE 504 to configure the UE 104 with the first PDCCH monitoring occasion configuration. For example, the first PDCCH monitoring occasion configuration may be a UE-specific configuration specified by an IE (e.g., monitoringSlotPeriodicityAndOffset) in an RRC message. The first PDCCH monitoring occasion configuration may aggregate data from multiple data packets into one or more transport blocks to be transmitted following each PDCCH monitoring occasion. The base station 502 may proceed to transmit aggregated data 525 according to the first PDCCH monitoring occasion configuration.

At block 530, the base station 502 may detect a change in link quality or traffic load. The change in link quality or traffic load may affect the ability of the base station 502 to transmit the data to the UE 504 using the first PDCCH monitoring occasion configuration. For example, a decrease in the link quality (e.g., reported CQI) may lead to a reduction in MCS and/or transport block size. Similarly, an increase in traffic load may result in more data to transmit than the first PDCCH monitoring occasion configuration allows. For example, the base station 502 may detect a change in link quality and/or traffic load by monitoring a maximum configured traffic rate and an actual traffic rate. The maximum configured traffic rate may be determined based on the MCS and the configured number of control channel monitoring occasions. The actual traffic rate may be determined based on the actual amount of data transmitted. If the actual traffic rate is greater than the maximum configured traffic rate, data packets may build up at the base station waiting for transmission. If the maximum configured traffic rate is much greater than the actual traffic rate (e.g. over 100% greater), increased traffic aggregation may be used to save power for the UE 504.

At block 532, the UE 504 may optionally also detect the change in link quality or traffic load. The UE 504 may detect the change in link quality or traffic load based on the same factors as the base station 502. Accordingly, the UE 504 may determine the change at approximately the same time or concurrently with the base station 502. In an aspect, the UE 504 may optionally transmit a request 534 for a change in configuration parameters. For example, the UE 504 may transmit a MAC-CE indicating an index of a preferred PDCCH monitoring occasion configuration.

In response to the change in link quality or traffic load the base station 502 and/or the UE 504 may reconfigure the PDCCH monitoring occasions. For example, the base station 502 may optionally transmit a reconfiguration message 540. In an aspect, for example, the base station 502 may transmit an RRC reconfiguration message with new PDCCH monitoring occasion parameters. As discussed above, however, an RRC reconfiguration may be relatively slow. In another aspect, the base station 502 may transmit a MAC-CE indicating an index to a defined set of control channel monitoring occasion configurations 550. For example, the defined set of control channel monitoring occasion configurations 550 may include a defined plurality of control channel configuration parameter sets. Each control channel configuration parameter set may include a set of parameters for a PDCCH monitoring occasion configuration. Accordingly, the index may indicate the parameters for a new PDCCH monitoring occasion configuration without carrying a full RRC IE. In another aspect, the base station 102 may signal the index to the defined set of control channel monitoring occasion configurations 550 at a physical layer, for example, in a DCI. The DCI may be carried on the PDCCH. The DCI may include the index.

In another aspect, the UE 504 may independently determine a new PDCCH monitoring occasion configuration in response to detecting the change in the link quality or the traffic load at block 532. For example, the UE 504 may determine a direction of the change in the link quality or the traffic load based on a detected condition. For instance, the UE 504 may determine whether a difference between a first traffic rate (e.g., a maximum throughput) based on an average MCS and a number of configured transmission/reception occasions differs from a second traffic rate (e.g., an actual data rate) based on average received data satisfies a threshold. For example, if the first traffic rate is greater than the second traffic rate by more than a threshold, Y, the UE 504 may switch to a control channel monitoring occasion configuration with a higher level aggregation. In contrast, if the first traffic rate is less than the second traffic rate by more than a second threshold, Z, the UE 504 may switch to a control channel monitoring occasion configuration with a lower level of aggregation (e.g., regular transmission mode).

At block 560, the base station 502 may reconfigure the control channel monitoring occasion configuration for the UE 504. That is, the base station 502 may configure data buffers and transmission parameters according to the new control channel monitoring configuration. Similarly, at block 562, the UE 504 may reconfigure itself according to the new control channel monitoring occasion configuration. For example, the UE 504 may set sleep cycles and monitoring times.

Figure 6:
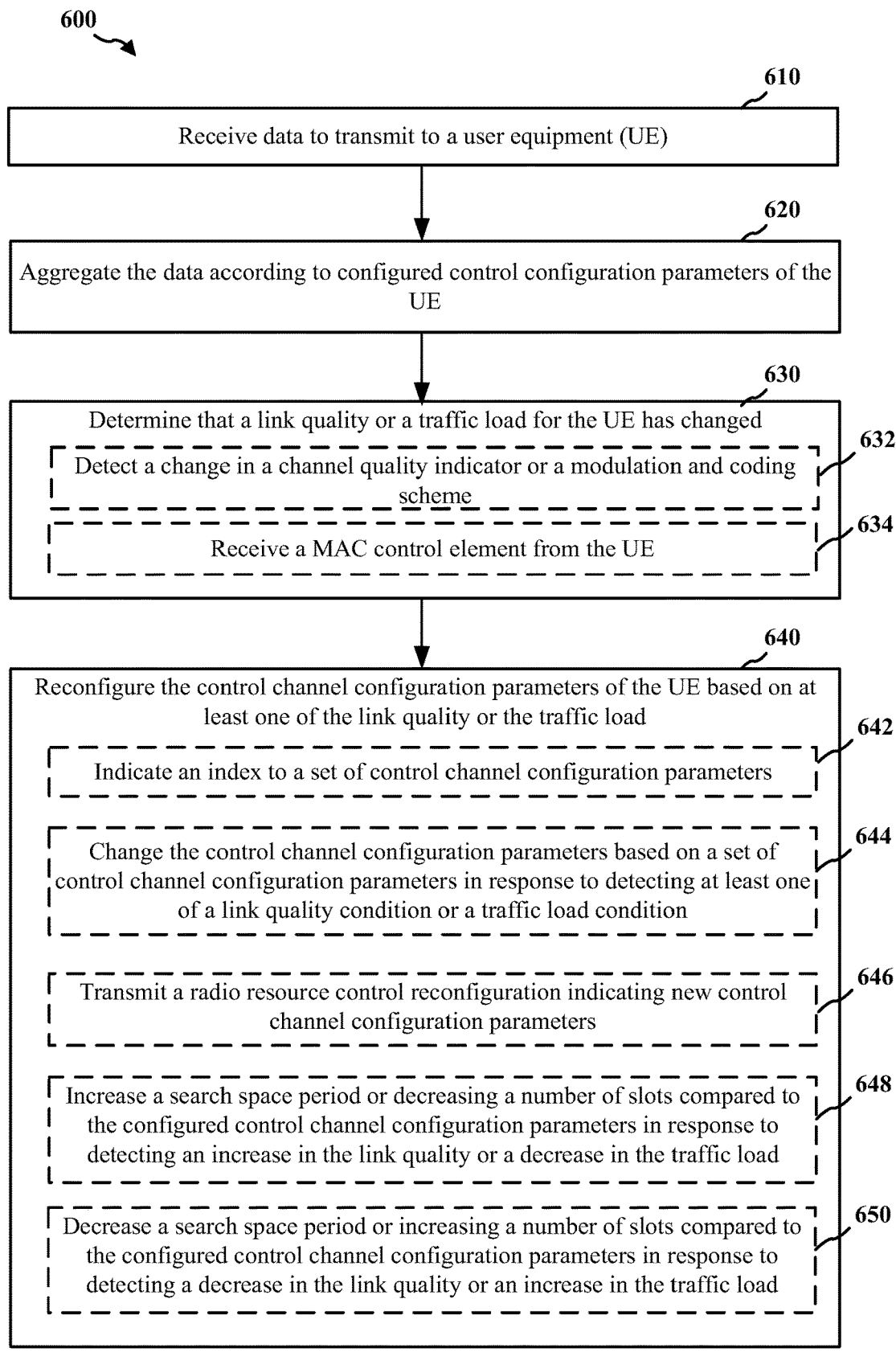
FIG. 6 is a flowchart of an example of a method of wireless communication that may be performed by a base station.

At block 570, the base station 502 may transmit aggregated data according to the new control channel monitoring occasion configuration. In particular, the base station 502 may transmit a PDCCH according to the control channel monitoring occasion configuration and transmit a PDSCH as indicated in the PDCCH. The aggregated data for the traffic load is scheduled at a traffic rate based on the link quality and the reconfigured control channel configuration parameters of the UE. The UE 504 may receive the PDCCH according to the new control channel monitoring occasion configuration, and receive the PDSCH as indicated in the PDCCH, FIG. 6 is a flowchart of a method 600 of wireless communication. The method 600 may be performed by a base station (e.g., the base station 102 including PDCCH aggregation component 140 or the apparatus 702/702'). Optional aspects are illustrated with a dashed line. The method 600 may be performed in conjunction with a UE (e.g., the UE 104 including the PDCCH configuration component 198 or the apparatus 1002). The method 600 may allow the base station 102 to dynamically change a control channel configuration of the UE 104 based on changes to link quality and/or traffic load, thereby allowing the UE to save power by sleeping between control channel monitoring occasions.

At 610, the base station 102 may receive data to transmit to the UE 104. In an aspect, for example, the base station 102 may include a backhaul component 712 to receive the data to transmit from a core network such as the EPC 160 and/or the core network 190. The backhaul component 712 may operate according to 3GPP standards. In an aspect, the data may have a data rate. For instance, the data may be defined by a radio bearer having quality of service (QoS) parameters such as delay and throughput.

At 620, the base station 102 may aggregate the data according to configured control channel configuration parameters of the UE 104. For example, the base station 102 may include an aggregation component 714 that may aggregate the data according to the control channel configuration parameters of the UE 104. For example, the aggregation component 714 may store the received data in a buffer (e.g., in memory 376) until a next PDCCH monitoring occasion for the UE 104. The base station 102 may then transmit a PDCCH 432 scheduling the UE 104 to receive a transport block 442 including the aggregated data, and a PDSCH transmitting the aggregated data.

At 630, the base station 102 may determine that a link quality or traffic load for the UE 104 has changed. The base station 102 may include a reception component 704 that receives link quality information based on a received signal. For example, at 632, the base station 102 may include a link quality component 708 to determine that a link quality has changed by detecting a change in a CQI and/or a MCS. The base station 102 may also include a traffic component 716 that monitors the received data packets and determines a traffic load or data rate of the traffic based on the received data packets. In an aspect, the base station 102 may determine that the link quality or traffic load for the UE has changed when a difference between a first traffic rate (e.g., a maximum throughput) based on an average MCS and a number of configured transmission/reception occasions differs from a second traffic rate (e.g., an actual data rate) based on average received data satisfies a threshold. As another example, at 634, the base station 102 may receive a MAC-CE from the UE. The MAC-CE may be the request 534 indicating a preferred set of control channel configuration parameters. Alternatively, the MAC-CE may indicate a change in the link quality or traffic load. The base station 102 may determine that the link quality or traffic load for the UE 104 has changed based on the reception of the MAC-CE from the UE.

At 640, the base station 102 may reconfigure the control channel configuration parameters for the UE based on at least one of the link quality or the traffic load. For example, the base station 102 may include a control channel configuration component 706 to reconfigure the control channel configuration parameters for the UE. The base station 102 may reconfigure the control channel configuration parameters based on a combination of the link quality and traffic load. For example, the base station 102 may determine a new set of control channel configuration parameters that satisfy the traffic load based on the link quality. The aggregated data for the traffic load may be scheduled at a traffic rate based on the link quality and the reconfigured control channel configuration parameters of the UE. For instance, at 648, the base station 102 may increase a search space period or decrease a number of slots compared to the configured control channel configuration parameters in response to detecting an increase in the link quality or a decrease in the traffic load. Conversely, at 650, the base station 102 may decreasing a search space period or increase a number of slots compared to the configured control channel configuration parameters in response to detecting a decrease in the link quality or an increase in the traffic load.

At 642, reconfiguring the control channel configuration parameters for the UE may include indicating an index to a set of control channel configuration parameters. For example, the base station 102 may transmit an indication (e.g., an index) as a MAC-CE or as a physical layer DCI parameter.

At 646, reconfiguring the control channel configuration parameters for the UE may include transmitting a radio resource control reconfiguration indicating new control channel configuration parameters. The radio resource control reconfiguration may be carried at a higher layer (i.e., RRC) over the PDSCH.

At 644, reconfiguring the control channel configuration parameters for the UE may include changing the control channel configuration parameters in response to detecting at least one of a link quality condition or a traffic load condition. In an aspect, the link quality condition or the traffic load condition may be predefined or configured for both the base station 102 and the UE 104, both of which may independently detect the link quality condition or the traffic load condition. For example, detecting the link quality condition or the traffic load condition may include detecting changes in estimated downlink and uplink throughputs and an estimated traffic rate for the UE. The estimated downlink and uplink throughputs may be determined based on MCS in a set of received downlink control information during a time window. The estimated traffic load may be determined based on the amount of traffic received in the time window. The duration of the time window may be configured for the UE by the base station. Accordingly, in an aspect, the base station 102 may not signal the change of the control channel configuration parameters to the UE 104.

Figure 7:
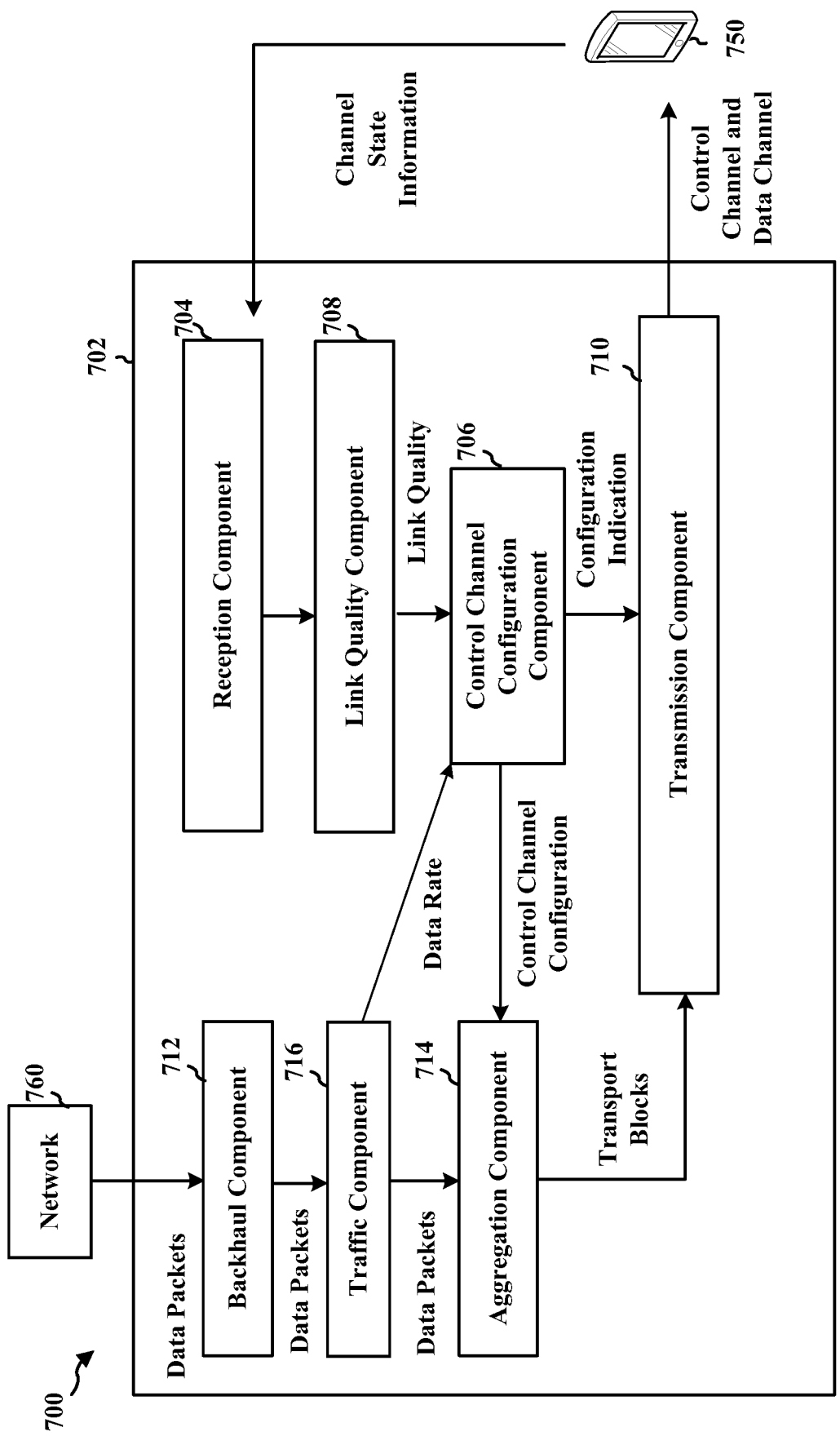
FIG. 7 is a conceptual data flow diagram illustrating an example of the data flow between different means/components in an example apparatus.

FIG. 7 is a conceptual data flow diagram 700 illustrating the data flow between different means/components in an example apparatus 702. The apparatus 702 may be a base station. The apparatus 702 includes a reception component 704 that receives channel state information from a UE 750, a link quality component 708 that determines a link quality based on the channel state information, a backhaul component 712 that receives data packets from a network 760, a traffic component 716 that determines a data rate based on the received data packets, a control channel configuration component 706 that determines control channel configuration parameters based on the link quality and the data rate, an aggregation component 714 that aggregates data packets into transport blocks according to the control channel configuration, and a transmission component 710 that transmits a control channel and a data channel to the UE 750.

The apparatus may include additional components that perform each of the blocks of the algorithm in the aforementioned flowchart of FIG. 6. As such, each block in the aforementioned flowchart of FIG. 6 may be performed by a component and the apparatus 702 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
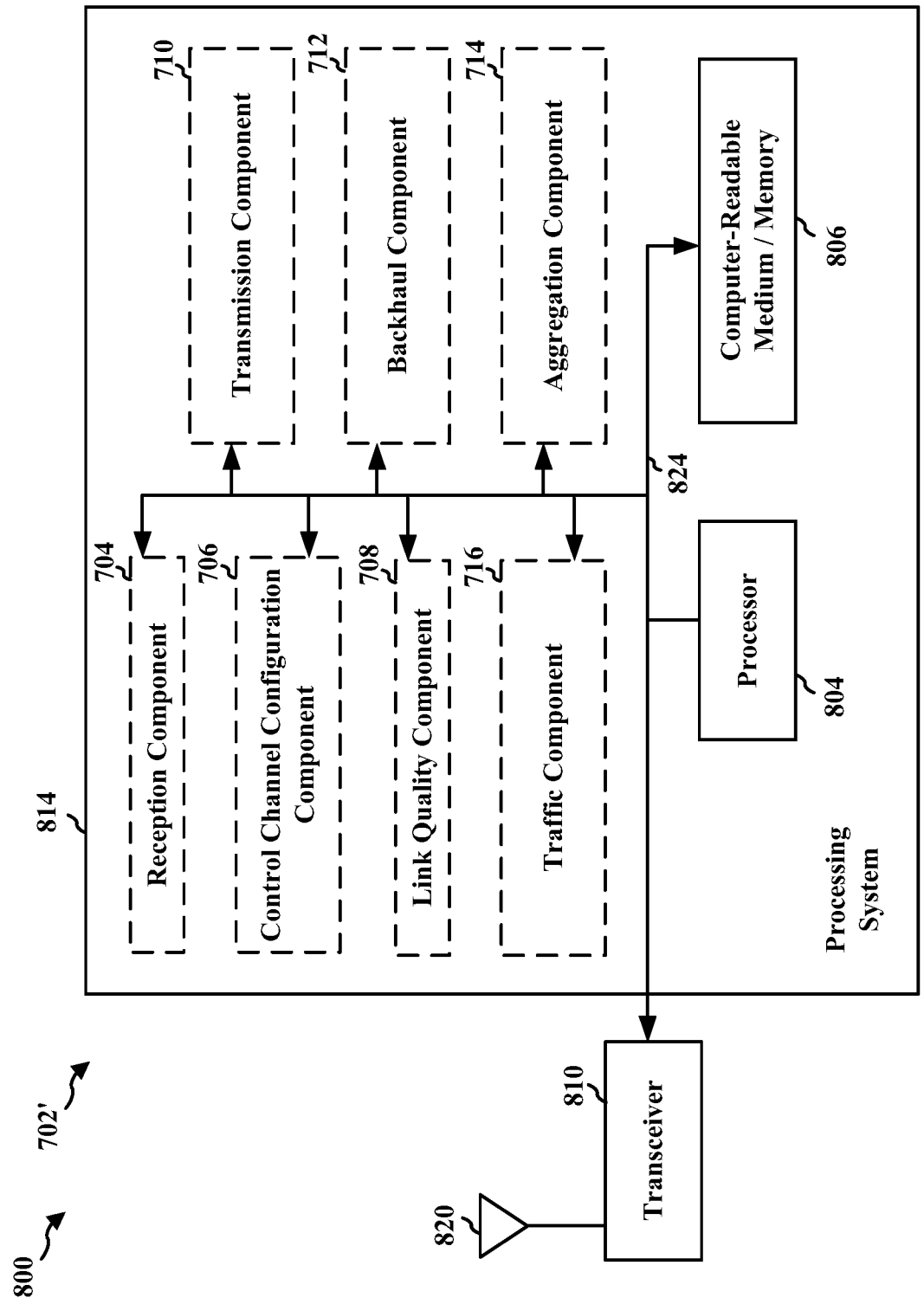
FIG. 8 is a diagram illustrating an example of a hardware implementation for an apparatus employing a processing system.

FIG. 8 is a diagram 800 illustrating an example of a hardware implementation for an apparatus 802' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and 716, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 710, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, and 716. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375.

In one configuration, the apparatus 702/702' for wireless communication includes means for receiving data to transmit to a UE; means for aggregating the data according to a configured control channel monitoring occasion of the UE; means for determining that a link quality or a traffic load for the UE has changed; and means for reconfiguring a control channel monitoring occasion for the UE based on at least one of the link quality or the traffic load. The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
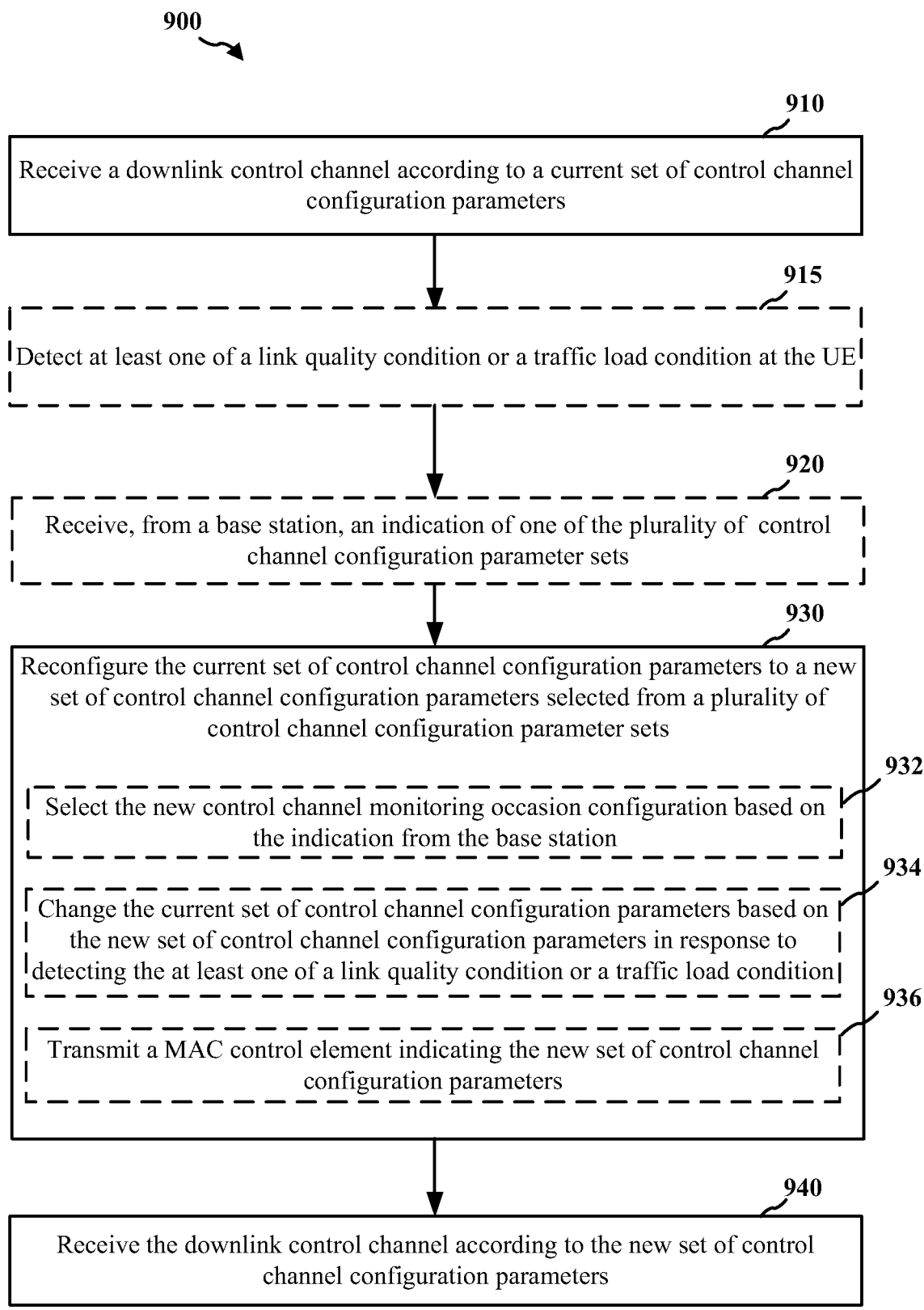
FIG. 9 is a flowchart of an example of a method of wireless communication that may be performed by a user equipment (UE).

FIG. 9 is a flowchart of a method 900 of wireless communication. The method 900 may be performed by a UE (e.g., the UE 104 including PDCCH configuration component 198 or the apparatus 1002/1002'). Optional aspects are illustrated with a dashed line. The method 600 may be performed in conjunction with a base station (e.g., the base station 102 including the PDCCH aggregation component 140 or the apparatus 902/902'). The method 900 may allow the UE 104 to dynamically change a control channel configuration based on changes to link quality and/or traffic load, thereby allowing the UE 104 to save power by sleeping between control channel monitoring occasions.

At 910, the UE 104 may receive a downlink control channel according to a current control channel monitoring occasion configuration. In an aspect, for example, the UE 104 may include reception component 1004 to receive the data to receive a downlink control channel according to current control channel configuration parameters. The reception component 1004 may be configured with a periodicity 430 of control channel monitoring occasions, a number of slots per control channel monitoring occasion, and/or HARQ process offset parameters. Accordingly, the current control channel configuration parameters may define when the UE 104 monitors for a control channel. The UE 104 may sleep between monitoring occasions. In an aspect, the current control channel configuration parameters may utilize data aggregation to extend a sleep period between monitoring occasions. In an aspect, the current control channel configuration parameters may be one of a defined plurality of control channel monitoring occasion configurations 550.

At 915, the UE 104 may detect at least one of a link quality condition or a traffic load condition at the UE. In an aspect, for example, the UE 104 may include measurement component 1006 to detect at least one of a link quality condition or a traffic load condition at the UE. The measurement component 1006 may changes in estimated downlink and uplink throughputs and an estimated traffic rate for the UE. The estimated downlink and uplink throughputs may be determined based on MCS in a set of received downlink control information during a time window. The estimated traffic load may be determined based on the amount of traffic received in the time window. The duration of the time window may be configured by the base station.

At 920, the UE 104 may optionally receive, from a base station 102, an indication of one set of a plurality of control channel configuration parameter sets (e.g., in control channel monitoring occasion configurations 550). For example, the UE 104 may include a reception component 1004 to receive the indication of the set. For example, the indication may be received as a MAC-CE or a physical layer DCI parameter. In an aspect, the indication may be an index to the plurality of control channel monitoring occasion configurations 550. In another aspect, the indication of the configuration may be an RRC reconfiguration message including a new set of control channel configuration parameters.

At 930, the UE 104 may reconfigure the current set of control channel configuration parameters to a new set of control channel configuration parameters selected from a plurality of control channel configuration parameters sets. For example, the UE 104 may include a configuration component 1012 to reconfigure the current control channel configuration parameters to new control channel configuration parameters selected from the plurality of control channel configuration parameter sets. For example, at 932, the configuration component 1012 may select the new control channel configuration parameters based on the indication from the base station 102. For instance, the configuration component 1012 may look up the new set of control channel configuration parameters in the plurality of control channel monitoring occasion configurations 550. The configuration component 1012 may set control channel parameters based on the selected control channel monitoring occasion configuration.

As another example, at 934, the configuration component 1012 may change the current set of control channel configuration parameters based on the new of control channel configuration parameters in response to detecting at least one of a link quality condition or a traffic load condition. For example, the UE 104 may include a measurement component 1006 to detect at least one of the link quality condition or the traffic load condition. The measurement component 1006 may measure both link quality and traffic load. For example, the measurement component 1006 may receive reference signals for determining the link quality. The measurement component 1006 may also determine a CQI based on the link quality. The measurement component 1006 may also determine a traffic load such as an average traffic rate. For instance, the measurement component 1006 may determine the average traffic rate based on the MCS and/or transport block size and number of transport blocks received following each PDCCH monitoring occasion. In an aspect, the measurement component 1006 may trigger a change to the control channel configuration parameters in response to detecting a difference between a first traffic rate based on an average MCS and a second average traffic rate for the UE meeting a threshold. In another aspect, the measurement component 1006 may detect changes in the estimated DL and UL link throughputs and estimated traffic rate for the UE 104. The measurement component 1006 may determine the estimated link throughout based on MCS in the set of received DCIs in a time window, whose duration is configured by the network. The measurement component 1006 may determine the estimated traffic load based on the amount of traffic received in a time window, whose duration is configured by network. In an aspect, at 936, the configuration component 1012 may transmit, via the transmission component 1010 a MAC-CE indicating the new set of control channel configuration parameters.

At 940, the UE 104 may receive the downlink control channel according to the new control channel monitoring occasion configuration. For example, the reception component 1004 may receive the PDCCH according to the new control channel configuration parameters. For example, if the UE 104 changes to the control channel monitoring occasion configuration 400, the reception component 1004 may monitor the PDCCH 412 according to the PDCCH periodicity 410. The reception component 1004 may also receive a data channel (e.g., transport blocks 414 of a PDSCH) based on the PDCCH 412.

Figure 10:
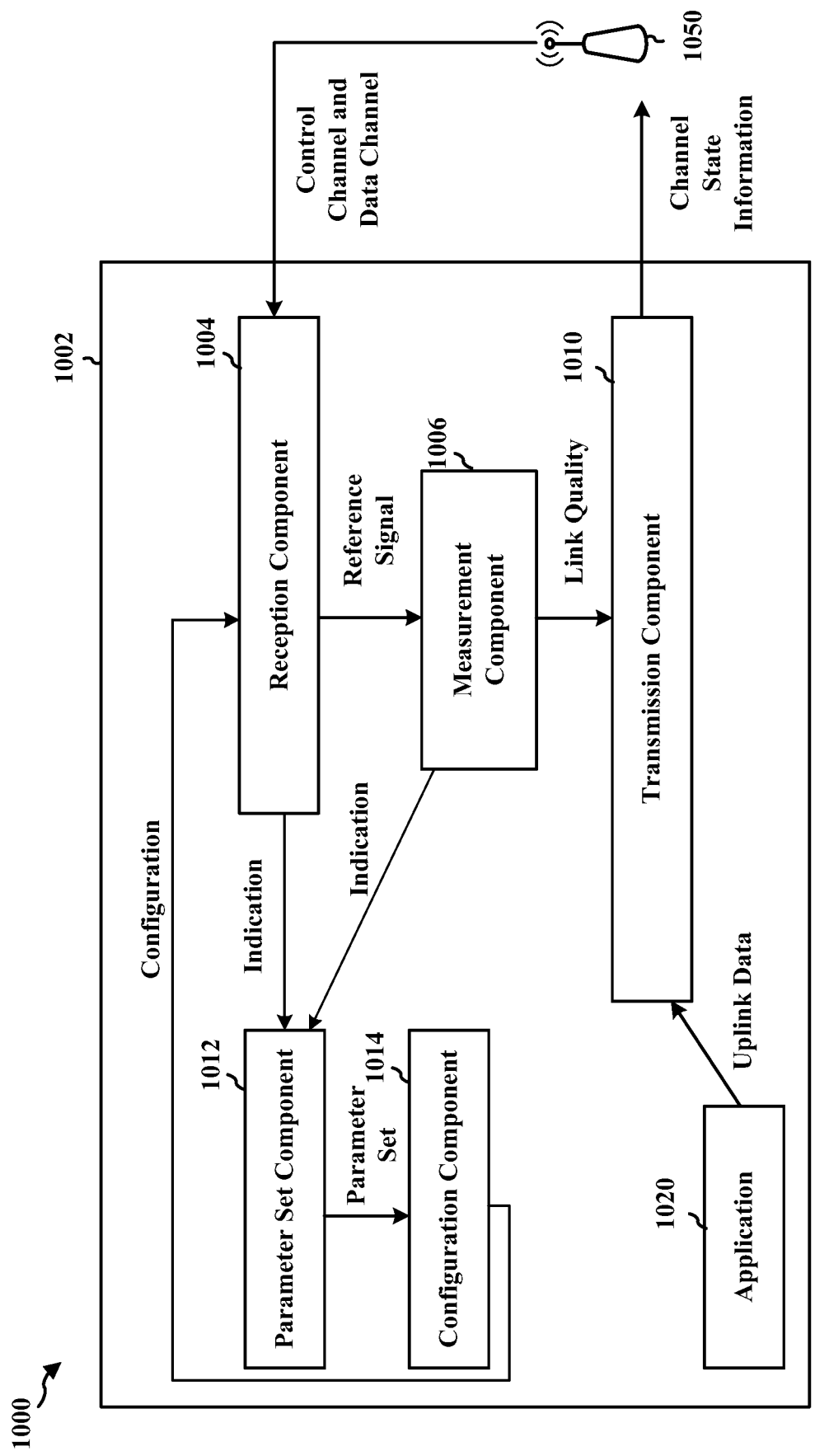
FIG. 10 is a conceptual data flow diagram illustrating an example of the data flow between different means/components in an example apparatus.

FIG. 10 is a conceptual data flow diagram 1000 illustrating the data flow between different means/components in an example apparatus 1002. The apparatus 1002 may be a UE. The apparatus 1002 includes a reception component 1004 that receives a control channel and data channel from a base station 1050, a measurement component 1006 that measures a link quality, a parameter set component 1012 that receives an indication and identifies one of the defined plurality of control channel configuration parameter sets, a configuration component 1014 that reconfigures control channel configuration parameters of the apparatus 1002, and a transmission component 1010 that transmits channel state information to the base station 1050. The transmission component 1010 may also transmit uplink data from an application 1020 to the base station 1050.

The apparatus 1002 may include additional components that perform each of the blocks of the algorithm in the aforementioned flowchart of FIG. 9. As such, each block in the aforementioned flowchart of FIG. 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
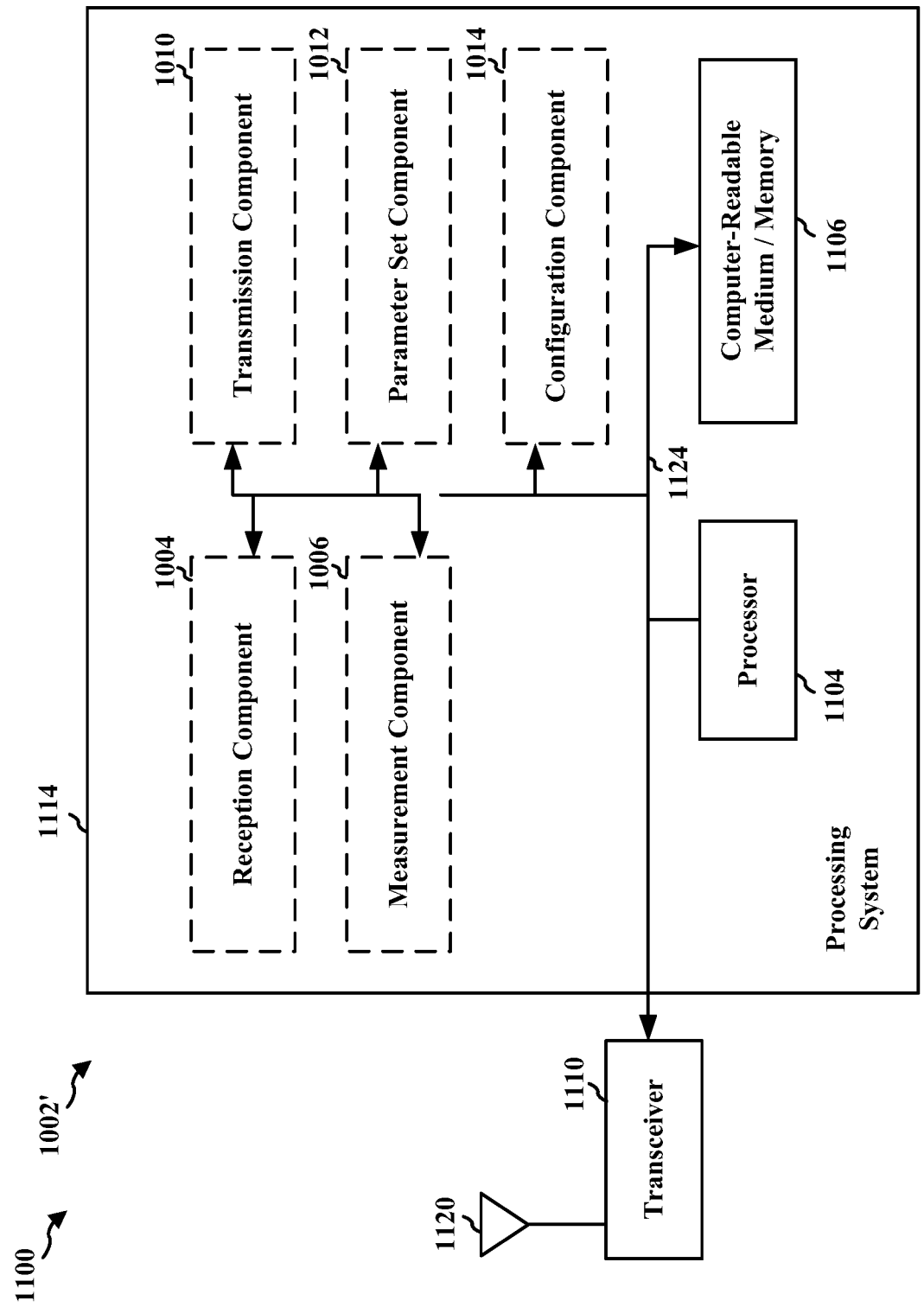
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1010, 1012 and 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 710, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1010, 1012 and 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for receiving a downlink control channel according to a current set of control channel configuration parameters; means for reconfiguring the current set of control channel configuration parameters to a new set of control channel configuration parameters selected from a plurality of control channel configuration parameter sets; and means for receiving the downlink control channel according to the new set of control channel configuration parameters. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In view of the foregoing, the present disclosure provides techniques for a base station and/or a UE to reconfigure control channel configuration parameters in response to changes in link quality and/or traffic load. Accordingly, data aggregation may be used to reduce the frequency of control channel monitoring occasions and allow the UE to sleep for longer periods of time, thereby saving power. Additionally, in an aspect, an indication of a change in the control channel configuration parameters may be signaled using physical layer DCI or MAC layer MAC-CE to quickly implement the change. In another aspect, both the base station and the UE may independently detect the changed conditions and implement new control channel configuration parameters to implement the change without signaling.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   receiving data to transmit to a user equipment (UE);
   aggregating the data according to configured control channel configuration parameters of the UE;
   determining that a link quality or a traffic load for the UE has changed; and
   reconfiguring control channel configuration parameters of the UE based on at least one of the link quality and the traffic load, wherein the aggregated data for the traffic load is scheduled at a traffic rate based on the link quality and the reconfigured control channel configuration parameters of the UE.

2. The method of claim 1, wherein reconfiguring the control channel configuration parameters comprises indicating an index to a set of control channel configuration parameters.

3. The method of claim 2, wherein the index to the set of control channel configuration parameters is signaled using a physical layer downlink control information, a media access control (MAC) control element.

4. The method of claim 2, wherein the set of control channel configuration parameters includes any combination of a periodicity of control channel monitoring occasions, a number of slots per control channel monitoring occasion, or hybrid automatic retransmission request (HARM) process offset parameters.

5. The method of claim 1, wherein reconfiguring the control channel configuration parameters comprises changing the control channel configuration parameters in response to detecting at least one of a link quality condition or a traffic load condition.

6. The method of claim 5, wherein the base station changes the control channel configuration parameters in response to detecting a difference between a first traffic rate based on an average modulation and coding scheme (MCS) and a second average traffic rate for the UE meeting a threshold.

7. The method of claim 5, wherein changing the control channel configuration parameters occurs without explicitly signaling the change of the control channel configuration parameters to the UE.

8. The method of claim 1, wherein reconfiguring the control channel configuration parameters comprises detecting changes in estimated downlink and uplink throughputs and an estimated traffic rate for the UE, wherein the estimated downlink and uplink throughputs are determined based on modulation and coding scheme in a set of received downlink control information during a time window, wherein the estimated traffic load is determined based on the amount of traffic received in the time window, wherein a duration of the time window is configured for the UE by the base station.

9. The method of claim 1, wherein reconfiguring the control channel configuration parameters comprises increasing a search space period or decreasing a number of slots compared to the configured control channel configuration parameters in response to detecting an increase in the link quality or a decrease in the traffic load.

10. The method of claim 1, wherein reconfiguring the control channel configuration parameters comprises decreasing a search space period or increasing a number of slots compared to the configured control channel configuration parameters in response to detecting a decrease in the link quality or an increase in the traffic load.

11. The method of claim 1, wherein determining that the link quality for the UE has changed comprises detecting a change in a channel quality indicator or a modulation and coding scheme.

12. The method of claim 1, wherein determining that the link quality for the UE has changed comprises receiving a MAC control element from the UE.

13. A method of wireless communication at a User Equipment (UE), comprising:
   receiving, from a base station, control information on a downlink control channel according to a current set of control channel configuration parameters;
   detecting at least one of a link quality condition or a traffic load condition at the UE;
   reconfiguring the current set of control channel configuration parameters to a new set of control channel configuration parameters selected from a plurality of control channel configuration parameter sets in response to detecting the at least one of the link quality condition or the traffic load condition; and
   receiving, from the base station, other control information on the downlink control channel according to the new set of control channel configuration parameters.

14. The method of claim 13, further comprising:
   receiving, from the base station, an indication of one of the plurality of control channel configuration parameter sets, wherein reconfiguring the current set of control channel configuration parameters comprises selecting the new set of control channel configuration parameters based on the indication from the base station.

15. The method of claim 14, wherein the indication is signaled using at least one of a physical layer downlink control information or a media access control (MAC) control element.

16. The method of claim 13, wherein the new set of control channel configuration parameters includes any combination of a periodicity of control channel monitoring occasions, a number of slots per control channel monitoring occasion, or hybrid automatic retransmission request (HARM) process offset parameters.

17. The method of claim 13, wherein reconfiguring the current set of control channel configuration parameters comprises detecting changes in estimated downlink and uplink throughputs and an estimated traffic rate for the UE, wherein the estimated downlink and uplink throughputs are determined based on modulation and coding scheme in the control information received on the downlink control channel during a time window, wherein the estimated traffic load is determined based on the amount of traffic received in the time window, wherein a duration of the time window is configured by the base station.

18. The method of claim 13, wherein the UE changes to the new set of control channel configuration parameters in response to detecting a difference between a first traffic rate based on an average modulation and coding scheme (MCS) and a second average traffic rate for the UE meeting a threshold.

19. The method of claim 13, further comprising transmitting a MAC control element indicating the new set of control channel configuration parameters.

20. An apparatus for wireless communication, comprising:
   a memory; and
   at least one processor coupled to the memory and configured to:
      receive data to transmit to a user equipment (UE);
      aggregate the data according to configured control channel configuration parameters of the UE;
      determine that a link quality or a traffic load for the UE has changed; and
      reconfigure control channel configuration parameters of the UE based on at least one of the link quality and the traffic load, wherein the aggregated data for the traffic load is scheduled at a traffic rate based on the link quality and the reconfigured control channel configuration parameters of the UE.

21. The apparatus of claim 20, wherein the at least one processor is configured to indicate an index of a set of control channel configuration parameters.

22. The apparatus of claim 21, wherein the index of the set of control channel configuration parameters is signaled using a physical layer downlink control information or a media access control (MAC) control element.

23. The apparatus of claim 21, wherein the set of control channel configuration parameters includes any combination of a periodicity of control channel monitoring occasions, a number of slots per control channel monitoring occasion, or hybrid automatic retransmission request (HARM) process offset parameters.

24. The apparatus of claim 20, wherein the at least one processor is configured to change the control channel configuration parameters in response to detecting at least one of a link quality condition or a traffic load condition.

25. The apparatus of claim 24, wherein the at least one processor is configured to change the control channel configuration parameters in response to detecting a difference between a first traffic rate based on an average modulation and coding scheme (MCS) and a second average traffic rate for the UE meeting a threshold.

26. The apparatus of claim 20, wherein the at least one processor is configured to detect changes in estimated downlink and uplink throughputs and an estimated traffic rate for the UE, wherein the estimated downlink and uplink throughputs are determined based on modulation and coding scheme in a set of received downlink control information during a time window, wherein the estimated traffic load is determined based on the amount of traffic received in the time window, wherein a duration of the time window is configured by the base station.

27. The apparatus of claim 20, wherein the at least one processor is configured to increase a search space period or decreasing a number of slots compared to the configured control channel configuration parameters in response to detecting an increase in the link quality or a decrease in the traffic load.

28. The apparatus of claim 20, wherein the at least one processor is configured to decrease a search space period or increasing a number of slots compared to the configured control channel configuration parameters in response to detecting a decrease in the link quality or an increase in the traffic load.

29. The apparatus of claim 20, wherein the at least one processor is configured to detect a change in a channel quality indicator or a modulation and coding scheme.

30. An apparatus for wireless communication, comprising:
- a memory; and
- at least one processor coupled to the memory and configured to:
    - receive control information on a downlink control channel according to a current set of control channel configuration parameters;
    - detect at least one of a link quality condition or a traffic load condition;
    - reconfigure the current set of control channel configuration parameters to a new set of control channel configuration parameters selected from a plurality of control channel configuration parameter sets in response to detection of the at least one of the link quality condition or the traffic load condition; and
    - receive other control information on the downlink control channel according to the new set of control channel configuration parameters.

* * * * *